US009145910B2

(12) United States Patent
Dieterle et al.

(10) Patent No.: US 9,145,910 B2
(45) Date of Patent: Sep. 29, 2015

(54) ULTRA HIGH STRENGTH SCREW HAVING A HIGH YIELD RATIO

(71) Applicant: KAMAX Holding GmbH & Co. KG, Homberg (Ohm) (DE)

(72) Inventors: Horst Dieterle, Weimar (DE); Uwe Merschrod, Schwalmtal-Storndorf (DE)

(73) Assignee: KAMAX HOLDING GMBH & CO. KG, Homberg (OHM) (DE)

( * ) Notice: Subject to any disclaimer, the term of this patent is extended or adjusted under 35 U.S.C. 154(b) by 314 days.

(21) Appl. No.: 13/678,891

(22) Filed: Nov. 16, 2012

(65) Prior Publication Data

US 2013/0129446 A1    May 23, 2013

(30) Foreign Application Priority Data

Nov. 18, 2011    (DE) .................. 10 2011 055 497

(51) Int. Cl.
*C21D 8/00* (2006.01)
*C22C 38/00* (2006.01)
*C22C 38/02* (2006.01)
*C22C 38/04* (2006.01)
*F16B 35/00* (2006.01)
*B23G 9/00* (2006.01)
*C21D 9/00* (2006.01)
*C21D 1/20* (2006.01)
*F16B 33/06* (2006.01)

(52) U.S. Cl.
CPC ............... *F16B 35/00* (2013.01); *B23G 9/001* (2013.01); *C21D 1/20* (2013.01); *C21D 9/00* (2013.01); *C21D 9/0093* (2013.01); *C22C 38/00* (2013.01); *C21D 2211/002* (2013.01); *F16B 33/06* (2013.01)

(58) Field of Classification Search
None
See application file for complete search history.

(56) References Cited

U.S. PATENT DOCUMENTS

| 3,528,088 A | 9/1970 | Köstlin et al. | |
| 4,563,222 A * | 1/1986 | Sugita et al. | 148/649 |
| 5,603,818 A * | 2/1997 | Brent et al. | 204/488 |
| 5,753,316 A * | 5/1998 | Brent et al. | 427/486 |
| 6,149,743 A | 11/2000 | Lund et al. | |
| 2007/0187003 A1 | 8/2007 | Takashima et al. | |
| 2009/0185943 A1* | 7/2009 | Inoue et al. | 420/8 |

FOREIGN PATENT DOCUMENTS

| DE | 1558505 A | 4/1970 |
| DE | 1758287 A | 1/1971 |
| DE | 2326882 A | 12/1973 |
| DE | 2817628 C2 | 8/1985 |
| DE | 69807297 T2 | 4/2003 |

(Continued)

OTHER PUBLICATIONS

Machine-English Translation of Japanese Patent No. 09-263875, Yamazaki Shingo et al., Oct. 7, 1997.*
"Verbindungs-element "Pass-Dehn-Schraube"-Mehrfachverschraubung im überelastischen Bereich" in "Der Konstrukteur 4", 1986, pp. 40, 42, 44.

(Continued)

*Primary Examiner* — Deborah Yee
(74) *Attorney, Agent, or Firm* — Thomas | Horstemeyer, LLP (57) ABSTRACT

A high strength screw (2), especially an ultra high strength screw (2) having a tensile strength $R_m$ of at least 1400 N/mm², having a bainite structure has a yield ratio of at least 0.95. The screw (2) belongs to the new strength classes 14.10, 15.10, 16.10 or 17.10. The high yield ratio is realized by heat treatment of the screw (2).

25 Claims, 6 Drawing Sheets

(56) References Cited

FOREIGN PATENT DOCUMENTS

| DE | 10326898 A1 | 12/2004 |
| DE | 102005004712 A1 | 8/2005 |
| DE | 102008041391 A1 | 1/2010 |
| EP | 1728883 A1 | 12/2006 |
| EP | 1564422 B1 | 2/2007 |
| GB | 1200423 A | 7/1970 |
| GB | 1425738 A | 2/1976 |
| GB | 1492720 A | 11/1977 |
| GB | 2019436 A | 10/1979 |
| JP | 09263875 A | 10/1997 |

OTHER PUBLICATIONS

"Handbuch der hochfesten Schrauben, 1. Auflage, 1986, p. 225, 8.3.3".
Takashima et al., Development of 1600 N/mm2 Class Ultra-High Strength Bolts, SAE Technical Paper Series 2003-01-1179, Mar. 2003, SAE International, Detroit, Michigan, US.
Resiak et al, New Bainitic Steels for High Strength Components for Automotive Parts, SAE Technical Paper Series 2007-01-1003, Apr. 2007, SAE International, Detroit, Michigan, US.
Noack, "Vortrag der Arcelor Mittal" Mar. 2008, ArcelorMittal, Homberg/Ohm, DE.

* cited by examiner

ULTRA HIGH STRENGTH SCREW HAVING A HIGH YIELD RATIO

CROSS REFERENCE TO RELATED APPLICATIONS

This application claims priority to co-pending German Patent Application No. DE 10 2011 055 497.1 entitled "Ultrahochfeste Schraube mit hohem Streckgrenzverhaltnis", filed Nov. 18, 2011.

FIELD OF THE INVENTION

The invention relates to a high strength screw, a screw joint including a high strength screw and a component as well as a method for producing a high strength screw.

BACKGROUND OF THE INVENTION

An ultra high strength screw having a bainite structure, a screw joint with such a screw and a component as well as a method for producing such a screw are known from German Patent Application No. DE 10 2008 041 391 A1. The bainite structure has been produced by austempering, and it substantially extends over the entire cross-section of the screw. The screw thus has a tensile strength $R_m$ of at least 1,400 N/mm². Due to the bainite structure, the screw has extremely high strength values in connection with maximum ductility values. The screw especially has a yield ratio of less than 90% and preferably of less than 80%.

Additional prior art is known from the examination procedure of the above described German Patent Application DE 10 2008 041 391. These are the documents DE 28 17 628 C2 (corresponding to GB 2 019 436 A), DE 1 758 287 A (corresponding to GB 1 200 423 A), DE 1 558 505 A (corresponding to U.S. Pat. No. 3,528,088), DE 23 26 882 A (corresponding to GB 1 425 738 A), DE 698 07 297 T2 (corresponding to U.S. Pat. No. 6,149,743), JP 09263875 A Patent Abstracts of Japan, DE 10 2005 004 712 A1 (corresponding to EP 1 564 422 B1), GB 1 492 720 A, EP 1 728 883 A1 (corresponding to US 2007/0187003 A1), DE 103 26 898 A1 as well as "Verbindungselement "Pass-Dehn-Schraube"-Mehrfachverschraubung im überelasti-schen Bereich" in "Der Konstrukteur 4", 1986, pages 40, 42, 44; "Handbuch der hoch-festen Schrauben, 1. Auflage, 1986, page 225, 8.3.3"; SAE-2003-01-1179; SAE-2007-01-1003; and "Vortrag der Arcelor Mittal".

SUMMARY OF THE INVENTION

The present invention relates to a high strength screw with a bainite structure which has a yield ratio of at least 0.95.

The invention also relates to a screw joint including such a high strength screw and a component being fastened by the high strength screw by screwing.

The invention also relates to a method of producing a high strength screw in which the screw having a bainite structure is heat-treated such that the screw attains a yield ratio of at least 0.95.

Definitions

Yield ratio: The yield ratio is to be understood as the ratio between the 0.2% proof stress $R_{p0.2}$ and the tensile strength $R_m$.

High strength screw: A high strength screw is to be understood as a screw having a tensile strength $R_m$ of at least 800 N/mm². In the prior art, high strength screws have been substantially understood as being part of the property classes 8.8, 10.9 and 12.9.

Ultra high strength screw: An ultra high strength screw is to be understood as a screw having a tensile strength $R_m$ of at least 1,400 N/mm².

Uniform elongation: The uniform elongation is to be understood as the plastic change of length, during a tensile test, in relation to the initial length when subjecting the screw with the force being associated with the tensile strength $R_m$. The uniform elongation thus indicates that the screw does not constrict in this region, but instead is uniformly extended.

Further Description

The novel screw thus has a yield ratio of at least 0.95. When the yield ratio is approximately 1, the proof stress approximately corresponds to the strength limit. This is also designated as an elastic/perfect plastic behavior. The screw plasticizes and does no longer work harden when further tightening the screw until it breaks. Such a screw is optimal for tightening the screw joint by yield stress controlled tightening methods as well as methods using the torque and angle tightening method.

Figure 3:
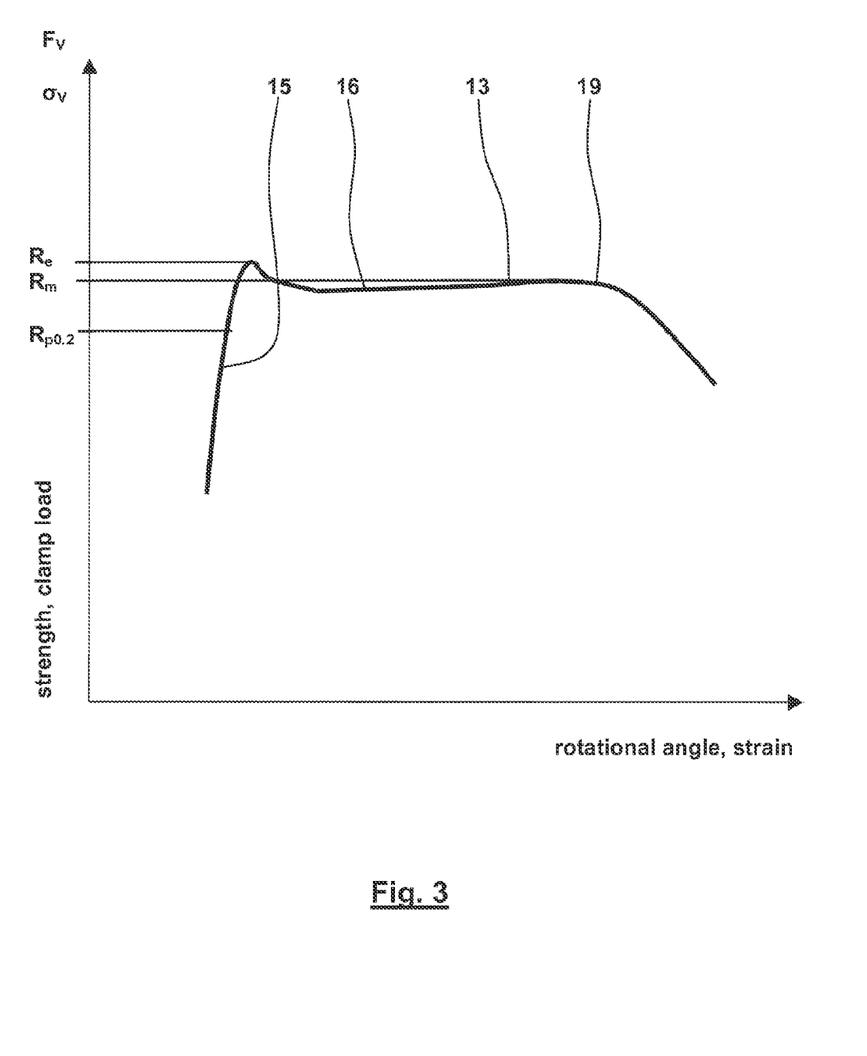
FIG. 3 illustrates a schematic stress strain diagram of a second exemplary embodiment of the novel screw joint.

A yield ratio of more than 1 means that the screw has its maximum strength and thus the maximum clamp load when reaching the yield point and that the clamp load then slightly decreases to a constant level (see FIG. 3). When tightening the screw by moment (torque) and the rotational angle, this slight decrease however does not cause problems.

The novel screw with the high yield ratio is also especially suitable for being tightened by a yield stress controlled tightening method. During such a tightening method, the tightening tool permanently detects the change of the slope in the curve of the torque and the rotational angle. Since this slope at the yield point deviates from Hooke's straight line, the yield point can be detected by this change. In the prior art, this detection was however practically not possible or very difficult since the used materials do not have distinctive yield points and thus the transition from Hooke's straight line into the plastic region was comparatively slow and not characteristic. Due to the novel yield ratio of the screw according to the invention of approximately 1, this transition now is clearly detectable and thus can also be clearly and accurately detected under rough operational conditions.

The novel screw comes very close to elastic/perfect plastic properties and it has a great forming capacity. Due to the high yield ratio and the good plasticity, it is possible to almost fully use the strength of the screw as well as the forming capacity and thus the maximum possible clamp load. Furthermore, it is possible to apply the maximum attainable clamp load while only causing little plastic deformation of the screw when tightening the screw for a plurality of times. The entire plasticity of the screw thus is available even when tightening the screw for a plurality of times in an over-elastic way.

When tightening screw joints including a high strength screw, it is often set forth in practice that the first tightening process and the second tightening process are to be conducted using the same tightening procedure. In the prior art using the known screws having a yield ratio of 0.8, for example, this causes problems when using this tightening provision two times or more. A first possibility was to tighten the screw joint until the plastic plateau after the elastic portion has been reached. During the next tightening process, the same clamp load is reached, but due to strain hardening caused by the first tightening process, greater plastification of the screw occurs at the same rotational angle. In other words, this second tightening process ends further on the right of the horizontal straight line representing the plastic deformation. A part of the forming capacity being available in the plateau has already been consumed. This leads to constriction and failure of the screw, respectively, either already during the second tightening process or during the following tightening processes. A second possibility is that tightening of the screw joint is stopped before having reached the plastic plateau. If one maintains this tightening provision of the first tightening process, different clamp loads result if the screw connecting is tightened for a plurality of times, which is also not desired. For optimal use of the strength of the screw, it is however necessary to tighten the screw significantly beyond the yield point.

Due to the high yield ratio of the novel screw of at least 0.95, especially between 0.97 and 1.05, preferably between 0.99 and 1.03, the same defined clamp load is reliably attained during multiple tightening processes of the screw joint. The high yield ratio means that there is a sharp kink in the stress strain diagram in the transition portion between the linear elastic portion (Hooke's straight line) and the plastic portion. This sharp kink can be reliably detected.

The novel high strength screw has a bainite structure which at least partly has been produced by austempering. The bainite structure leads to extremely high tensile strength while there also is extremely high ductility. This high ductility or toughness substantially differentiates the bainite structure from a martensite structure which is produced in the prior art in the known way by hardening and following tempering. In contrast thereto, austempering means that hardening is instead realized by rapid cooling from the austenite phase due to an isothermal structural transformation in the bainite phase. The element, especially the screw, is located in a salt bath at an isothermal temperature until the structural transformation from austenite to bainite has been completed over the entire cross-section. The tempering step being required during martensite hardening preferably may be omitted. Thus, the tendency of hardening distortion is reduced.

Due to austempering, the direct structural transformation from martensite and thus the abrupt lattice transformation resulting in great lattice tensions is omitted. This means that the parts having the bainite structure are characterized by extremely high strength values in combination with maximum ductility values. For further details and advantages of the bainite structure, it is referred to German Patent Application DE 10 2008 041 391 A1 of the applicant.

The high yield ratio is especially attained by specific method steps after austempering. In a first variant, the first respective method step is cold forming of the screw resulting in the dislocation density in the material being increased. This cold forming may be especially a tensile stress ("stretching") in an axial direction. However, combined tensile and torsional stresses are also possible as cold forming steps. It is essential that the realized deformation results in a certain increase of the dislocation density in the material.

In a following method step or a separate method step, heat treatment of the screw at comparatively low temperatures is realized. The heat treatment causes precipitations and diffusion of interstitially dissolved alloying elements—as especially C, B and N—, that collect in the dilatation portion of the dislocations and that prevent dislocating movements. In this way, resistance is increased and one attains a higher yield point. The tensile strength $R_m$ is not changed or not significantly changed (especially, it is increased by approximately 5%), such that essentially an increase of the 0.2 proof stress $R_{p0.2}$ accounts for the increase of the yield ratio. Heat treatment may especially occur at a temperature of between 100° C. and 400° C., preferably between 120° C. and 250° C., for example during treatment periods of 0.5 to 50 hours. The time duration of the heat treatment depends on the condition of the material, its chemical composition and the desired strength.

In another variant of the producing method for attaining the high yield point, the cold forming step after austempering is omitted. However, heat treatment of the screw takes place, this treatment especially taking place at a temperature of between 350° C. and 600° C., preferably between 400° C. and 550° C., at treatment periods of 0.5 to 2 hours, for example. Due to the higher treatment temperatures, heat treatment in this case leads to a reduction of the tensile strength due to healing of dislocations, on the one hand, and to the precipitation of carbides of the alloying elements, as for example Cr, Mo, Mn, Ni and V, Nb or Ti on the other hand. This leads to a dislocating movement being prevented and thus the yield point being increased or at least a decrease of the yield point being counteracted due to the healing of dislocations. The desired increase of the yield ratio is thus realized in this method by reducing the tensile strength while the yield point remains approximately the same.

Independent of the fact if the second heat treatment takes place with or without intermediate cold forming, it can be advantageously combined with additional method steps of producing the screw—especially with a surface coating step anyway taking place and requiring a heat treatment for evaporating or burning-in of the coating materials, for example. Such surface treatments are e.g. used for increasing corrosive protection.

The screw especially has a uniform elongation of at least 0.5%, preferably of at least 0.6%. This means that the plateau in the stress strain diagram is comparatively long and thus multiple tightening operations of the screw joint above the yield point are possible without constriction and failure of the screw. The same defined clamp load can also be realized easily during a second, third, fourth, fifth, and so forth tightening process of the screw joint.

It is known that high strength screws are produced by cold forming. The starting material used for this process is usually called "wire". The wire used for the novel high strength screw may be made of cold formable non-hardened and non-tempered steel, and it may have a carbon content of approximately 0.2% to 0.6%. The steel may include alloying elements, especially Cr, Mo, Mn, Ni, V, Nb or Ti with a total share of more than approximately 1.1%.

The screw may be designed as an ultra high strength screw having a tensile strength $R_m$ of at least 1400 N/mm$^2$. Such a ultra high strength screw with the novel yield ratio also provides extremely high clamp loads in a reproducible way during multiple tightening processes. According to the accepted naming conventions, such a screw would be in the strength classes 14.10, 15.10, 16.10, 17.10 or higher (that still need to be defined).

The screw may include a coating in the form of an anti-friction lacquer, a bonded coating or a lubricant, the lubricant especially including MoS, MoS$_2$, graphite, polyethylene or a different polymer as the lubricating material. Alternatively, the screw may be phosphated and oiled. These coatings provide uniform friction coefficients also during multiple tightening processes such that the conditions during multiple tightening processes are standardized in this way.

The screw may have a small share of martensite of less than 15%. The feature according to which the high strength screw has a bainite structure does not mean that this feature is not realized when there are small portions of a different structure—martensite or retained austenite, for example. The bainite structure preferably predominantly consists of lower bainite and it can also include structural portions of the upper bainite as well as of the lower bainite or of grained bainite. In addition, there may be small portions of martensite in a controlled way, i.e. portions of especially less than approximately 15%, portions of approximately 10% or less, portions of between 8% and 11% or portions of between approximately 3% and 5%. These portions relate to the surface portions of the martensite in an average cross-sectional surface of the screw. Due to the martensite portion, the tensile strength is increased, while the bainite portion is kept great enough to attain the desired high durability.

The novel method for producing the high strength screw includes the following steps:
producing a bainite structure,
heat treatment of the screw such that the screw attains a yield ratio of at least 0.95.

Before the second method step, there may be another method step during which cold forming of the screw is realized, for example by stretching in an axial direction. Another method step is the production of the thread. This may take place at different points in time, as this will be further explained herein below.

Advantageous developments of the invention result from the claims, the description and the drawings. The advantages of features and of combinations of a plurality of features mentioned at the beginning of the description only serve as examples and may be used alternatively or cumulatively without the necessity of embodiments according to the invention having to obtain these advantages. Without changing the scope of protection as defined by the enclosed claims, the following applies with respect to the disclosure of the original application and the patent: further features may be taken from the drawings, in particular from the illustrated designs and the dimensions of a plurality of components with respect to one another as well as from their relative arrangement and their operative connection. The combination of features of different embodiments of the invention or of features of different claims independent of the chosen references of the claims is also possible, and it is motivated herewith. This also relates to features which are illustrated in separate drawings, or which are mentioned when describing them. These features may also be combined with features of different claims. Furthermore, it is possible that further embodiments of the invention do not have the features mentioned in the claims.

The number of the features mentioned in the claims and in the description is to be understood to cover this exact number and a greater number than the mentioned number without having to explicitly use the adverb "at least". For example, if an element is mentioned, this is to be understood such that there is exactly one element or there are two elements or more elements. If however it is intended to mention the exact number of a feature, the adjective "exactly" is used before the respective feature. Additional features may be added to these features, or these features may be the only features of the respective product.

Other features and advantages of the present invention will become apparent to one with skill in the art upon examination of the following drawings and the detailed description. It is intended that all such additional features and advantages be included herein within the scope of the present invention, as defined by the claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention. In the drawings, like reference numerals designate corresponding parts throughout the several views.

DETAILED DESCRIPTION

Figure 1:
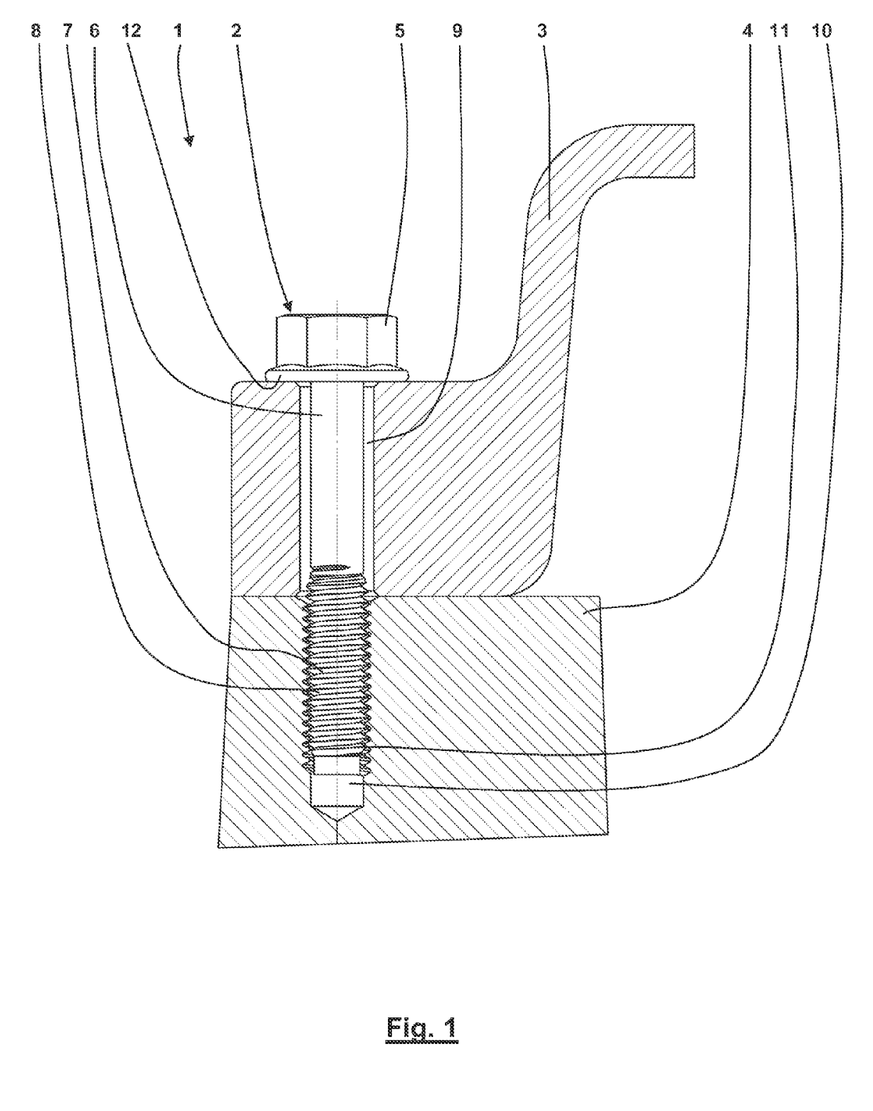
FIG. 1 illustrates a first exemplary embodiment of the novel screw joint including a high strength screw and a component.

Referring now in greater detail to the drawings, FIG. 1 illustrates a first exemplary embodiment of a screw joint 1 including a high strength screw 2 as well as a first component 3 and a second component 4. The screw 2 includes a head 5, a shank portion 6 and a threaded portion 7 having an outer thread 8. The first component 3 includes a bore 9, and the second component 4 includes a bore 10. The bore 10 has an inner thread 11 corresponding to the outer thread 8 of the screw 2. The clamping force being necessary for realizing a secure screw joint 1 is realized by the engaging threads 8, 11 and the head contact surface 12 of the head 5 of the screw 2.

The novel screw 2 is an ultra high strength screw having a tensile strength of at least 1400 N/mm$^2$. The screw 2 has a bainite structure substantially extending over the entire cross-section of the screw 2. Especially, the bainite structure has been produced by austempering. The screw 2 may be initially tightened during a training tightening process during which the screw 2 is tightened beyond its yield point. For finally producing the screw joint 1, the second tightening process of the screw joint 1 is realized in the sense of at least reaching the increased yield point resulting from the training tightening process.

Figure 2:
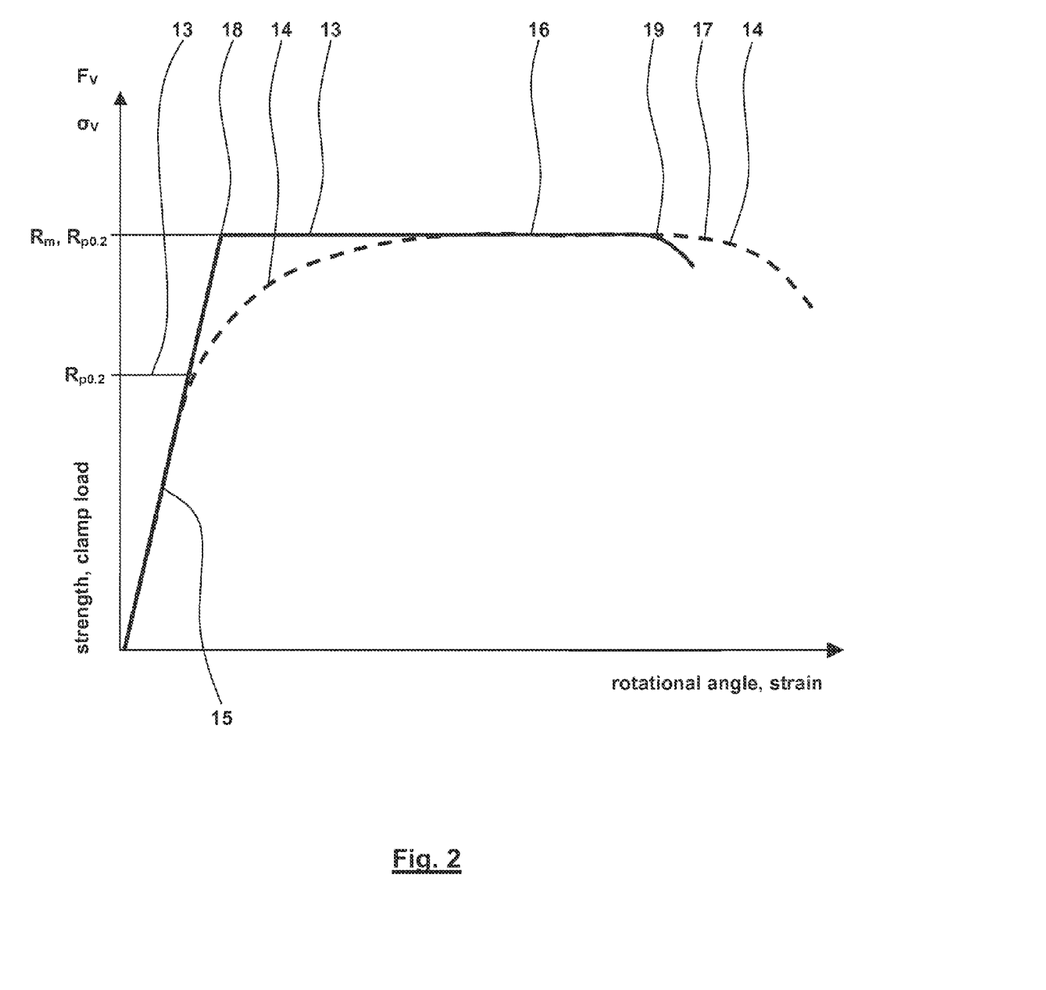
FIG. 2 illustrates a schematic stress strain diagram of a first exemplary embodiment of the novel screw joint compared to the prior art.

FIG. 2 illustrates a schematic stress strain diagram of a first exemplary embodiment of the novel screw joint 1 compared to a common screw joint according to the prior art. The curve of the screw joint 1 according to the invention illustrated by the continuous line is designated by reference numeral 13, while the curve of the screw joint according to the prior art illustrated by the broken line is designated by reference numeral 14.

In the screw joint of the prior art, the curve follows the usual course, i.e. after Hooke's straight line 15, there is a transition portion extending over a comparatively great rotational angle and comparatively great straining, respectively, until the plastic plateau 16 is reached. The 0.2% proof stress $R_{p0.2}$ and the tensile strength $R_m$ differ substantially such that a yield ratio of approximately 0.8 or 0.9 at the maximum is realized. The plateau 16 following further tightening of the screw joint is comparatively short and ends in a constriction point 17. Further tightening of the screw joint then leads to failure.

As it is to be seen well in FIG. 2, the course of the curve according to the invention 13 substantially differs from the one of the prior art 14. Hooke's straight line 15 is longer, and it is connected to the plateau 16 by a comparatively sharp kink point 18 due to the fact that the yield ratio is approximately 1. The 0.2 proof stress $R_{p0.2}$ and the tensile strength $R_m$ thus have approximately the same value. Compared to the prior art 14, the plateau 16 has a much longer horizontal extension, and it then ends in the constriction point 19. This comparatively great length of the plateau 16 means that the novel screw 2 has comparatively great plasticity while the tension is constant. The uniform elongation resulting therefrom may be especially at least 0.5% and preferably at least 0.6%.

FIG. 3 illustrates a schematic stress strain diagram of a second exemplary embodiment of the novel screw joint 1. In contrast to the embodiment according to FIG. 2, this is a case in which the yield point $R_e$ is located above the tensile strength $R_m$. The transition between Hooke's straight line 15 and the plateau 16 differs from the one illustrated in FIG. 2. It is to be seen that a plateau 16 also being comparatively long is available.

Figure 4:
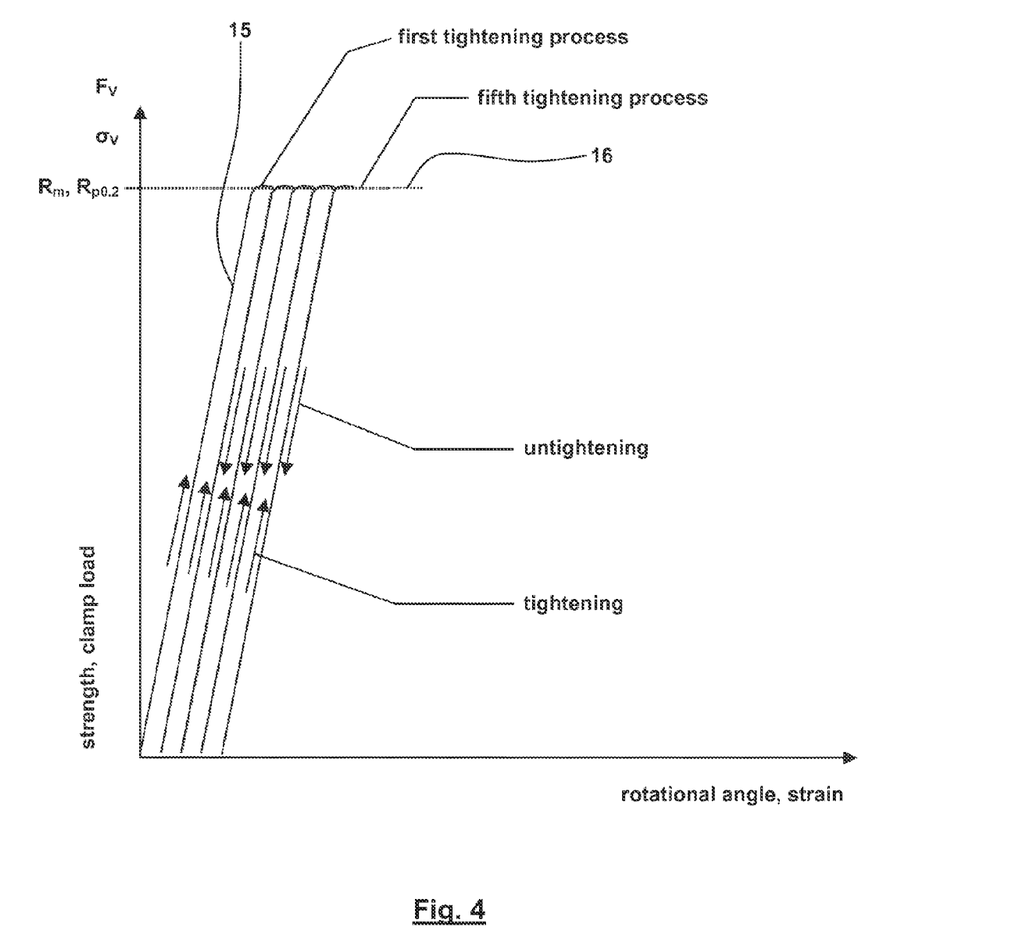
FIG. 4 illustrates a schematic stress strain diagram of the novel screw joint according to FIG. 1 when being tightened for a plurality of times.

FIG. 4 illustrates a schematic stress strain diagram of the novel screw joint 1 according to FIG. 1 during multiple tightening with the rotational angle tightening provision or the combined tightening provision with the joining moment plus the rotational angle. In the present example, there are five consecutive tightening processes. It is to be seen that after tightening the screw joint 1 beyond the point where the 0.2 proof stress $R_{p0.2}$ has been reached, a constant clamp load of the screw 2 is attained. After the first tightening process (see the left upward arrow) and the following untightening (or loosening) process (see the left downward arrow) the second tightening process (see the second upward arrow from the left), $R_m$ and $R_{p0.2}$ are reached after a greater rotational angle. In this sense, a part of the plateau 16 has already been consumed. The same applies accordingly during the third, fourth, fifth and so forth tightening process. Compared to the prior art, $R_m$ and $R_{p0.2}$ are always already reached at a smaller rotational angle, and only a smaller part of the plateau 16 is consumed during each tightening process. Due to the great uniform elongation, the screw 2 has sufficient potential to provide constant tensional forces during multiple tightening with the same tightening provision. When using a yield stress controlled tightening method in which the transition point can be very well detected in the screw 2 according to the invention, the tightening curves and the untightening curves are located even substantially closer to one another such that the screw 2 can be tightened practically for an unlimited number of times.

Figure 5:
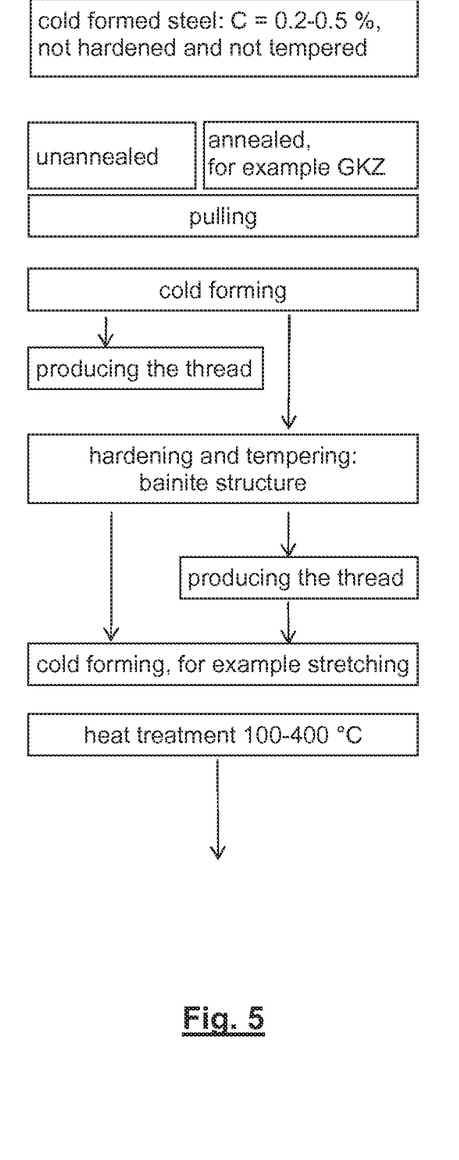
FIG. 5 illustrates a block diagram of a first exemplary embodiment of the novel method for producing a novel screw.

FIG. 5 illustrates a block diagram of a first exemplary embodiment of the novel method for producing the screw 2. The block diagram partly illustrates variants of the method by listing different items on the left side and on the right side, respectively. The starting material is a cold formed steel not being hardened and not being tempered and having a carbon content of approximately 0.2 to 0.5%. The steel can either be unannealed or annealed (by annealing on spheroidized cementite; "GKZ annealing"). Cold forming takes place after stretching. In the following, the thread can be produced or, without this step, the bainite structure is produced, especially by austempering. If the thread has not yet been produced, this is then realized in the next step. In the following, further cold forming is realized, for example by stretching. Finally, heat treatment takes place, especially by a temperature of between approximately 100° C. and 400° C.

Figure 6:
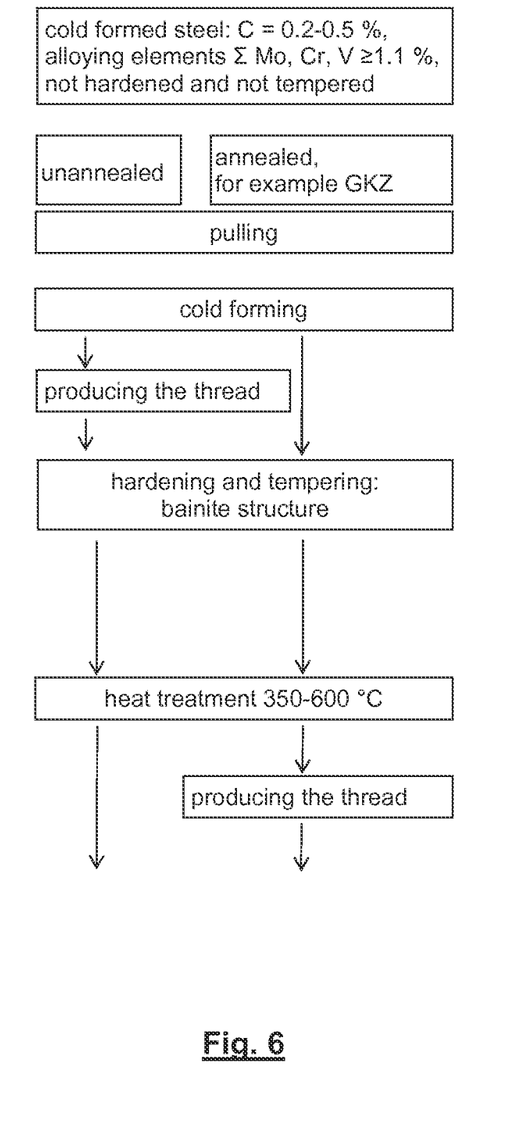
FIG. 6 illustrates a block diagram of a second exemplary embodiment of the novel method for producing a novel screw.

FIG. 6 shows a block diagram of a second exemplary embodiment of the novel method for producing a screw 2. In this case, the cold formed steel includes alloying elements of a total of more than approximately 1.1%. Especially, these alloying elements may be Cr, Mo, Mn, Ni, V, Nb and Ti. The following method steps are then conducted in the same way as in the embodiment according to FIG. 5. In contrast thereto, the cold forming step, for example by stretching, does not take place, and instead heat treatment takes place at greater temperatures. These temperatures may be especially approximately between 350° C. and 600° C. In case the thread has not yet been produced by cold forming, this is realized afterwards.

Many variations and modifications may be made to the preferred embodiments of the invention without departing substantially from the spirit and principles of the invention. All such modifications and variations are intended to be included herein within the scope of the present invention, as defined by the following claims.

We claim:

1. A method of producing a high strength screw, comprising the steps:
    producing the screw from a wire by cold forming; and
    heat treatment of the screw having a bainite structure substantially extending over the entire cross-section of the screw such that the screw attains a yield ratio of between 0.97 and 1.05 and a uniform elongation of at least 0.5%.

2. The method of claim 1, wherein the bainite structure is at least partly produced by austempering.

3. The method of claim 1, wherein the yield ratio has been realized after austempering by cold forming and following heat treatment of the screw.

4. The method of claim 3, wherein cold forming of the screw is stretching in an axial direction and heat treatment of the screw is realized at a temperature of between 100° C. and 400° C.

5. The method of claim 1, wherein the yield ratio after austempering is realized by heat treatment of the screw at a temperature of between 350° C. and 600° C.

6. The method of claim 1, wherein the wire is made of cold formable unhardened and untempered steel having a carbon content of 0.2% to 0.6%.

7. The method of claim 6, wherein the steel includes alloying elements, namely, Cr, Mo, Mn, Ni, V, Nb and Ti, with a total share of more than approximately 1.1%.

8. The method of claim 1, wherein the screw is designed as an ultra high strength screw having a tensile strength $R_m$ of at least 1400 N/mm².

9. The method of claim 1, further comprising the steps:
    applying a coating to the screw, the coating being selected from the group consisting of an anti-friction lacquer, a bonded coating and a lubricant, the lubricant including at least one material selected from the group consisting of MoS, $MoS_2$, graphite, polyethylene and other polymers.

10. The method of claim 1, further comprising the steps:
    phosphating and oiling of the screw.

11. The method of claim 1, wherein the screw includes a low share of martensite of less than 15%.

12. A method of producing a high strength screw, comprising the steps:
    producing the screw from a wire by cold forming;
    austempering of the screw such that it attains a bainite structure substantially extending over the entire cross-section of the screw;
    cold forming of the screw by stretching; and
    heat treatment of the screw at a temperature of between 100° C. and 400° C. such that the screw attains a yield ratio of between 0.97 and 1.05 and a uniform elongation of at least 0.5%.

13. A method of producing a high strength screw, comprising the steps:

producing the screw from a wire by cold forming;

austempering of the screw such that it attains a bainite structure substantially extending over the entire cross-section of the screw; and heat treatment of the screw at a temperature of between 350° C. and 600° C. such that the screw attains a yield ratio of between 0.97 and 1.05 and a uniform elongation of at least 0.5%.

14. A high strength screw having a bainite structure substantially extending over the entire cross-section of the screw, wherein the screw has a yield ratio of between 0.97 and 1.05 and a uniform elongation of at least 0.5%.

15. The screw of claim 14, wherein the bainite structure is at least partly produced by austempering.

16. The screw of claim 14, wherein the yield ratio has been realized after austempering by cold forming and following heat treatment of the screw.

17. The screw of claim 16, wherein cold forming of the screw is stretching in an axial direction and heat treatment of the screw is realized at a temperature of between 100° C. and 400° C.

18. The screw of claim 14, wherein the yield ratio after austempering is realized by heat treatment of the screw at a temperature of between 350° C. and 600° C.

19. The screw of claim 14, wherein the screw has a uniform elongation of at least 0.6%.

20. The screw of claim 14, wherein the screw has been produced from wire being made of cold formable unhardened and untempered steel having a carbon content of 0.2% to 0.6%.

21. The screw of claim 14, wherein the steel includes alloying elements, namely, Cr, Mo, Mn, Ni, V, Nb and Ti with a total share of more than approximately 1.1%.

22. The screw of claim 14, wherein the screw is designed as an ultra high strength screw having a tensile strength $R_m$ of at least 1400 N/mm².

23. The screw of claim 14, wherein the screw includes a coating, the coating being selected from the group consisting of an anti-friction lacquer, a bonded coating and a lubricant, the lubricant including at least one material selected from the group consisting of MoS, $MoS_2$, graphite, polyethylene and other polymers.

24. The screw of claim 14, wherein the screw is phosphated and oiled.

25. The screw of claim 14, wherein the screw includes a low share of martensite of less than 15%.

* * * * *